July 11, 1944.   C. D. BOURCIER   2,353,386
MUNITIONS AND TACTICAL USE OF THE SAME
Filed Aug. 17, 1942
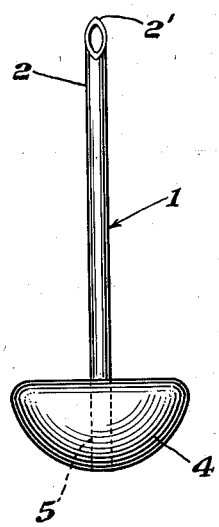
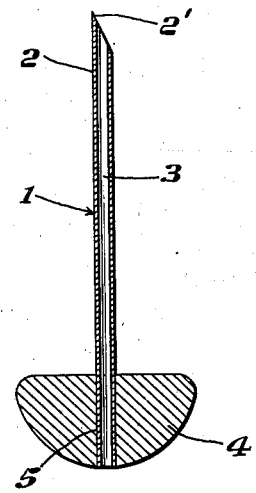
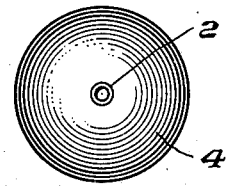
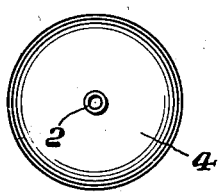
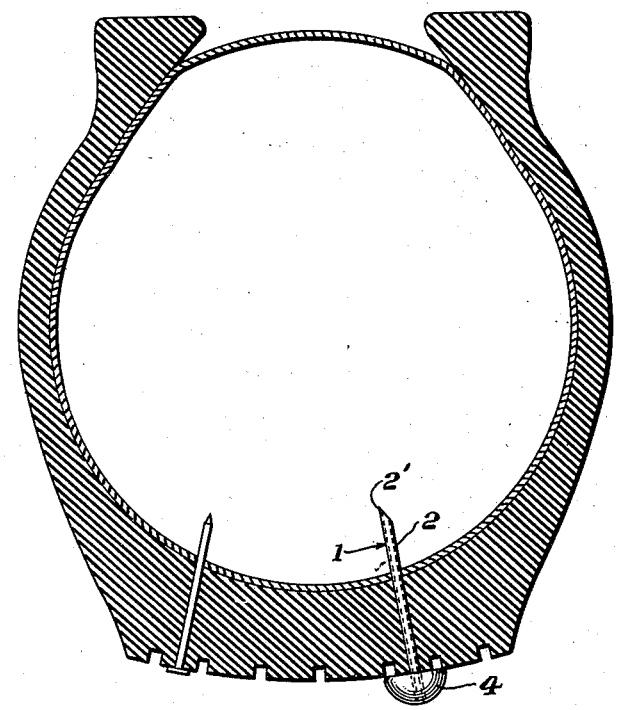
INVENTOR.
CHARLES D. BOURCIER
BY
ATTORNEYS Patented July 11, 1944

2,353,386

UNITED STATES PATENT OFFICE 2,353,386

MUNITIONS AND TACTICAL USE OF THE SAME

Charles D. Bourcier, Grafton, Mass.

Application August 17, 1942, Serial No. 455,142

2 Claims. (Cl. 256—1)

My present invention relates to a novel type of munitions devised to cripple military traffic by penetrating and deflating the pneumatic tires of vehicles equipped with such tires.

While my invention is effective against cavalry, horse drawn equipment and soldiers on foot, the destructive effect of tire punctures on aircraft at their take-off or landing, and the paralyzing effect on a motorized column when even a relatively few units are halted by punctures well illustrate the military advantages of munitions in accordance with my invention.

The consequences of punctured tires have, of course, been recognized for a long time. While the tendency of the rubber to squeeze against the puncturing element frequently retards deflation, the tubes adapted for military use are internally coated with a sealing material which, when forced into the puncture, either prevents the escape of air or holds the leakage to a minimum.

Munitions in accordance with my invention comprise tire deflating units each consisting of a hollow, sharpened shaft or lance supported by and extending through a base. The shafts are of sufficient length to penetrate well within the tube to ensure that the air passage cannot be blocked by the sealing medium and the bases are weighted so that the units will be self-erecting into an operative position.

Because of their effectiveness, such deflators may be used for a wide variety of offensive or defensive purposes as they provide means by which a small force may either put vehicles out of commission or so immobilize motorized vehicles that they may be destroyed by artillery or bombing attacks, the efficiency of which is at a maximum against stationary objectives.

As this disclosure is directed more particularly to those trained in the arts of war, I need only suggest possible strategic and tactical techniques to show the novel features and advantages of deflators in accordance with my invention for the illustration of which I have shown a simple form, both easy to manufacture and efficient to use. In the drawing:

Fig. 1 illustrates in side elevation a unit in accordance with my invention.

Fig. 2 shows a central vertical section of the same.

Fig. 3 is a face end view.

Fig. 4 is a top plan view of such a unit, and

Fig. 5 shows a cross section of a tire with a nail and lance puncture illustratively compared.

I have indicated at 1 a hollow puncturing lance member having an end 2 preferably sharpened as at 2'. The member 1 has its hollow bore 3 free from end to end but to aid prompt deflation of a tire 1 preferably supply its surface with a lubricant which is slightly solvent to latex or like tire sealing content used as filling intended to close the ordinary puncture by the casual nail or like article accidentally present in the path of traffic.

The member 1 extends through a heavy supporting base 4 which may be advantageously of hemispherical form with its flat zonal side toward the end 2, but disposed low down on the opposite or butt end 5 of the member 1 and leaving the bore 3 unobstructed. The base 4 is so formed and connected as to bring the center of gravity of the units so low that the deflators will be self-erecting into an operative position on the road or other surface on which they may be dropped or otherwise disposed, and yet be sufficiently free to permit and assist the penetration of any over-running tires of enemy vehicles. For convenience in manufacture, the base 4 may be cast on the lower end of the lance 1.

Lance members according to my invention are of sufficient length to penetrate the tire and well within the tube being driven into and through the tire by the weight of the vehicle. While the lance members meet with the usual squeeze pressure from the rubber of said tire and tube this pressure and any sealing medium within the tube does not in any way shut up the open passage that then exists from the air interior of the tube to the outer atmosphere through the lances 1.

Instantly the air pressure in the tube is reduced, the tire is flattened. Thus by a simple process I have flattened tires and no vehicle can travel on a flat tire. The vehicle is out of action as quickly and effectively as if hit, even if not wrecked, and even wrecking is possible when a flat tire is effected at high speed.

Now that I have described the construction and operation of my tire deflator or lance, it is in order briefly to consider the employment or potential tactics of this new weapon.

Convoys engaged in transportation of troops, supplies, guns, reconnaissance, scouting, "blitz" movements, etc., can be engaged, for example, as follows.

A scout or scout force on a highway, detecting the approach of an enemy convoy, can communicate his information to his proper base and report that he will stop the convoy at a given point on the highway as coordinated with his map and plan. It may be selected, for example, as a point on a highway, on the up-slope or reverse slope of a hill, a narrow roadway, bridge crossing, between embankments or over a causeway or on a curve according to the scouts' best judgment or intuition.

Such artillery batteries as are in range, or bombers in striking distance having been notified of the impending tie-up or road block at that given point may be prepared to blast any delayed convoy jammed to a stop by the disabled vehicles.

A scout on a motorcycle or in a "jeep" car can do this quickly by tossing or otherwise scattering the lance members onto the highway or other path of the enemy vehicles even as he speeds away from the scene towards his own lines. The lance deflators thus released, because of their construction, balance themselves quickly to an operative position of "at point" and are ready to do their work on the tires.

Lance units according to my invention can be sprinkled quickly from a plane flying over a road, field, or airport, in advance of enemy transport, enemy landings, or enemy horse, foot or motor advance of any kind. When the enemy reaches the point where such lance deflators are on duty, they will stop at once and stay there until the damage is repaired to the tires or until the crippled vehicles have been removed. Vehicles such as scout cars or motorcycles, or horsemen cannot advance to reconnoiter and safely pass over the lances. Under fire, it would be rather difficult to send mopping up troops to clear the road. Some might be gathered up, but the objective of blocking the advance of the enemy would have been accomplished.

Many uses, still unknown, will be developed as my inventions come into more extended use and practice. Various modifications in the construction and use of my lance member may obviously be resorted to if within the limits of the appended claims.

What I therefore claim and desire to secure by Letters Patent is:

1. Defense munitions consisting of small tire puncturing units each comprising a heavy hemispherical base and a hollow sharp pointed lance rigidly supported in said base and extending vertically from the flat side thereof and having its hollow interior opening through the curved side of said base so as to be vented therethrough, said base having its center of gravity low on the lance whereby to support it tiltably in an erect posture whereby to make piercing contact with the pneumatic tire of a vehicle running over it so as to cause the tire to become suddenly deflated.

2. Munition units as in claim 1 in which the hollow lance is a relatively thin tubular needle having its sharpened end formed as an angular cut secant to the tubular axis of the lance.

CHARLES D. BOURCIER.